United States Patent
Haase et al.

(10) Patent No.: US 10,514,512 B2
(45) Date of Patent: Dec. 24, 2019

(54) OPTICAL CONNECTOR

(71) Applicants: Michael A. Haase, St. Paul, MN (US);
Terry L. Smith, Roseville, MN (US);
Barry J. Koch, Florence, TX (US);
Ding Wang, Austin, TX (US);
Alexander R. Mathews, Austin, TX
(US); 3M INNOVATIVE PROPERTIES COMPANY, St. Paul, MN (US)

(72) Inventors: Michael A. Haase, St. Paul, MN (US);
Terry L. Smith, Roseville, MN (US);
Barry J. Koch, Florence, TX (US);
Ding Wang, Austin, TX (US);
Alexander R. Mathews, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 275 days.

(21) Appl. No.: 14/420,479

(22) PCT Filed: Sep. 27, 2013

(86) PCT No.: PCT/US2013/062265
§ 371 (c)(1),
(2) Date: Feb. 9, 2015

(87) PCT Pub. No.: WO2014/055361
PCT Pub. Date: Apr. 10, 2014

(65) Prior Publication Data
US 2015/0219863 A1      Aug. 6, 2015

Related U.S. Application Data

(60) Provisional application No. 61/710,083, filed on Oct. 5, 2012.

(51) Int. Cl.
*G02B 6/38* (2006.01)
*G02B 6/36* (2006.01)
*G02B 6/00* (2006.01)

(52) U.S. Cl.
CPC .......... *G02B 6/3883* (2013.01); *G02B 6/3845* (2013.01)

(58) Field of Classification Search
CPC .. G02B 6/3893; G02B 6/3869; G02B 6/4214;
G02B 6/3885; G02B 6/3882; G02B 6/3873; G02B 6/3883
(Continued)

(56) References Cited

U.S. PATENT DOCUMENTS

| 4,312,564 A | 1/1982 | Cefarelli et al. |
| 4,708,432 A | 11/1987 | Berg |

(Continued)

FOREIGN PATENT DOCUMENTS

| CA | 1245490 | 11/1988 |
| GB | 2059621 | 4/1981 |

(Continued)

OTHER PUBLICATIONS

International Search Report for PCT International Application No. PCT/US2013/062265 dated Dec. 13, 2013, 4 pages.

*Primary Examiner* — Kaveh C Kianni
*Assistant Examiner* — Hung Q Lam
(74) *Attorney, Agent, or Firm* — Jonathan L. Tolstedt

(57) ABSTRACT

Optical connectors are provided for connecting sets of optical waveguides, such as optical fiber ribbons to each other, to printed circuit boards, or to backplanes. The provided connectors utilize expanded beam optics with non-contact optical mating resulting in relaxed mechanical precision requirements. The provided connectors can have low optical loss, are easily scalable to high channel count (opti- (Continued)

cal fibers per connector) and can be compatible with low insertion force blind mating.

13 Claims, 7 Drawing Sheets

(58) Field of Classification Search
USPC ........ 385/53, 60, 61, 65, 74, 79, 82, 83, 88, 385/89, 92, 93, 139
See application file for complete search history.

(56) References Cited

U.S. PATENT DOCUMENTS

| | | | |
|---|---|---|---|
| 5,222,168 A | 6/1993 | Saito et al. | |
| 5,706,371 A * | 1/1998 | Pan | G02B 6/2746 385/11 |
| 5,745,620 A | 4/1998 | Bergmann | |
| 5,835,654 A | 11/1998 | Bergmann | |
| 7,066,657 B2 | 6/2006 | Murali | |
| 7,133,589 B2 * | 11/2006 | Tateiwa | G02B 6/25 385/114 |
| 7,473,038 B2 | 1/2009 | Fujiwara | |
| 7,534,052 B2 | 5/2009 | Fujiwara | |
| 7,726,885 B2 | 6/2010 | Nishimura | |
| 8,165,432 B2 | 4/2012 | Ohta | |
| 8,620,122 B2 | 12/2013 | Meadowcroft | |
| 9,523,819 B2 * | 12/2016 | Liu | G02B 6/327 |
| 2003/0044123 A1 * | 3/2003 | Kiani | G02B 6/3885 385/59 |
| 2003/0174998 A1 | 9/2003 | Shevachuk | |
| 2006/0210225 A1 * | 9/2006 | Fujiwara | G02B 6/4214 385/92 |
| 2011/0064358 A1 | 3/2011 | Nishimura | |
| 2011/0317959 A1 | 12/2011 | Ohta | |
| 2012/0033921 A1 | 2/2012 | Haley et al. | |
| 2012/0063725 A1 | 3/2012 | Meadowcroft | |
| 2012/0099820 A1 | 4/2012 | Rolston | |
| 2012/0183256 A1 | 7/2012 | Shao | |
| 2013/0121635 A1 * | 5/2013 | Thacker | G02B 6/26 385/15 |
| 2014/0185991 A1 * | 7/2014 | de Jong | G02B 6/32 385/79 |
| 2015/0063760 A1 * | 3/2015 | Pommer | G02B 6/4251 385/79 |

FOREIGN PATENT DOCUMENTS

| | | |
|---|---|---|
| JP | S61-217007 | 9/1986 |
| JP | H06-337330 | 6/1994 |
| JP | 2008-158001 | 7/2008 |
| WO | WO 2008-005515 | 1/2008 |
| WO | WO 2013-048730 | 4/2013 |
| WO | WO 2013-048743 | 4/2013 |
| WO | WO 2013-180943 | 12/2013 |
| WO | WO 2014-055226 | 4/2014 |
| WO | WO 2014-055360 | 4/2014 |

* cited by examiner

OPTICAL CONNECTOR

RELATED CASES

The present application is related to jointly-owned patent applications, 61/710,077, entitled, "Optical Connector", and 61/710,067, entitled "Unitary Optical Ferrule" which were filed on the same date herewith and are herein incorporated by reference in their entireties.

TECHNICAL FIELD

The provided disclosure relates to optical connectors for connecting sets of optical waveguides such as optical fiber ribbons.

BACKGROUND

Optical fiber connectors can be used to connect optical fibers in a variety of applications including: telecommunications networks, local area networks, data center links, and internal links in high performance computers. These connectors can be grouped into single fiber and multiple fiber designs and also grouped by the type of contact. Common contact methods include: physical contact wherein the mating fiber tips are polished to a smooth finish and pressed together; index matched, wherein a compliant material with an index of refraction that is matched to the core of the fiber fills a small gap between the mated fibers' tips; and air gap connectors, wherein the light passes through a small air gap between the two fiber tips. With each of these contact methods a small bit of dust at the tips of the mated fibers can greatly increase the light loss.

Another type of optical connector is referred to as an expanded beam connector. Expanded beam connectors can be either collimating, or conjugate focus designs, both of which give a large beam diameter at the surface of the output optical element, where dirt can collect. This type of connector allows the light beam in the source connector to exit the fiber core and diverge within the connector for a short distance before the light leaves the connector with a diameter substantially greater than the core. In the receiving connector the beam is then focused back to its original diameter on the tip of the receiving fiber. This type of connector is less sensitive to dust and other forms of contamination.

Backplane optical connectors will become essential components of high-performance computers, data centers, and telecom switching systems in the near future, as line rates of data transmission migrate from the current 10 Gb/sec/line to 25 Gb/sec/line in the next few years. It would be advantageous to provide expanded beam connectors enabling optical interconnect systems which are lower cost and higher performance alternatives to copper connections that are currently being used in the 10 Gb/sec interconnects.

SUMMARY

The provided disclosure relates to optical connectors for connecting sets of optical waveguides, such as optical fiber ribbons, to mating optical waveguides, which may be disposed on printed circuit boards or backplanes. In particular, the provided connectors utilize expanded beam optics with non-contact optical mating resulting in relaxed mechanical precision requirements, thus enabling low-cost injection molding and improved resistance to dirt. The provided connectors can have low optical loss, can be easily scalable to high channel count (optical fibers per connector), can provide safety to the user, and can be compatible with low insertion force blind mating. The provided connectors can have suitability for use for backplane, front-plane, or mid-span connections.

In one aspect, a connector is provided that includes a first waveguide alignment member for receiving and aligning at least one first optical waveguide, a first light redirecting member comprising an input side for receiving input light along an input direction from a first optical waveguide disposed and aligned at the first waveguide alignment member, a light redirecting side for receiving light from the input side along an incident direction and redirecting the received light along a different redirected direction, and an output side for receiving light from the light redirecting side and transmitting the received light as output light in an output direction toward an input side of a first light redirecting member of a mating connector. In some embodiments, the connector can be configured so that when the connector mates with the mating connector, the output side of the first light redirecting member faces the input side of the first light redirecting member of the mating connector. The connector also includes first and second registration features for mating with registration features of a mating connector.

In another aspect, a connector assembly is provided that includes a connector receiving and aligning first and second optical waveguides and comprising an input side for receiving first and second input lights from the first and second optical waveguides along respective first and second incident directions at respective first and second locations on the input side and transmitting the received lights as respective first and second transmitted lights, a first light redirecting side for receiving the first and second transmitted lights at respective first and second locations on the light redirecting side and redirecting the received lights as respective first and second redirected lights along respective first and second redirected directions. The first redirected direction can be different than the first incident direction, the second redirected direction can be different than the second incident direction. The connector assembly can also include an output side for receiving the first and second redirected lights at respective first and second locations on the output side along a respective first and second output direction and transmitting the received lights as respective first and second output lights toward an input side of a first light redirecting member of a mating connector. The connector can be configured so that when the connector mates with the mating connector, the output side of the connector is parallel to and faces the input side of the mating connector, and first and second registration features for mating with registration features of a mating connector.

The provided optical connectors use expanded beam optics with non-contact mating that can result in relaxed mechanical fabrication requirements. This can, in turn, enable the use of processes such as low-cost injection molding and can result in connectors that have improved resistance to dirt and contamination. The provided connectors can have low optical loss, typically less than 1.0 dB per mated connector pair. Additionally, the provided connector can be easily and economically scaled to have 256 or more connected optical waveguides. The provided connectors have a low insertion force, blind mating and are suitable for high speed backplane, front-plane, or mid-span connections.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 2b is a portion of what is shown in FIG. 2a.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
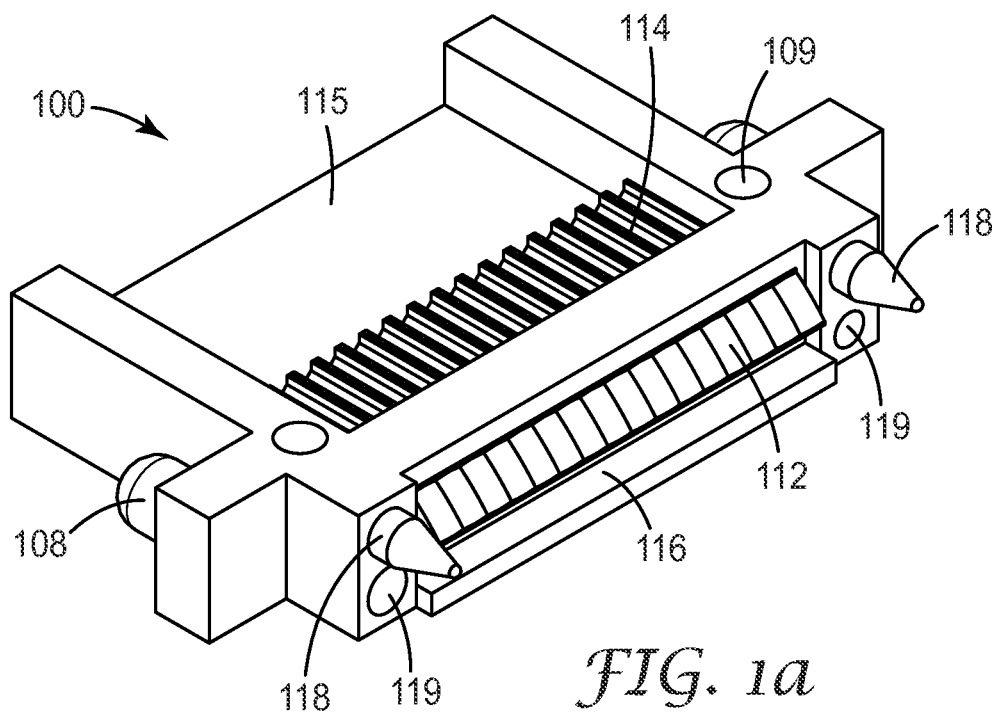
FIGS. 1a and 1b are top and bottom perspective views of an embodiment of a provided connector.

The optical cables used in many applications make use of fiber ribbons. These ribbons are comprised of a set of coated fibers joined together in a line (typically 4, 8 or 12 fibers in a line). The individual glass fibers with their protective coatings are typically 250 microns in diameter and the ribbons typically have a fiber to fiber pitch of 250 microns. This 250 micron spacing has also been used in optical transceivers with a variety of designs spacing the active optical devices at the same 250 micron spacing.

Currently available expanded beam multiple fiber connectors typically limit the beam diameter to 250 microns to match the ribbon pitch. In order to achieve a beam diameter greater than the fiber pitch, current connectors generally require the fiber ribbon to be split into single fibers before mounting the fibers on the connector.

In general, single fiber optical connectors can include a precision cylindrical ferrule for aligning and contacting optical fiber end faces with each other. The optical fiber can be secured in the central bore of the ferrule so that the fiber's optical core can be centered on the ferrule axis. The fiber tip can then be polished to allow physical contact of the fiber core. Two such ferrules can then be aligned with each other using an alignment sleeve with the polished fiber tips pressed against each other to achieve a physical contact optical connection from one fiber to another. Physical contact optical connectors are widely used.

Multiple fiber connectors can often use a multiple fiber ferrule such as the MT ferrule to provide optical coupling from the source fibers to the receive fibers. The MT ferrule can guide the fibers in an array of molded bores to which the fibers are typically bonded. Each ferrule can have two additional bores in which guide pins are located to align the ferrules to each other and thus align the mated fibers.

A variety of other methods have also been used to make fiber to fiber connections. Included are V-groove alignment systems such as found in VOLITION optical fiber cable connectors, and bare fiber alignment in an array of precise bores. Some connecting concepts make use of lenses and or reflecting surfaces in optical fiber connections. Each of these connecting concepts describes single purpose connection systems, such as an in line connector or a right angle connector.

Optical fiber connectors such as multiple fiber connectors are useful for connecting optical waveguides to printed circuit boards (PCBs) and in backplane optical interconnect products. Expanded beam connectors have been disclosed that can terminate fiber ribbons without separating individual fibers and also can provide a beam with a diameter greater than the fiber-to-fiber pitch. These expanded beam optical connectors have non-contact optical mating and can require less mechanical precision than conventional optical connectors.

Novel optical interconnect coupling constructions or optical connectors are provided that can be used to connect one or more optical waveguides, or a ribbon of optical waveguides to another set of optical waveguides or one or more ribbons of optical waveguides. In some embodiments, the waveguides can be optical fibers. The described connectors can also be used to connect one or more optical waveguides, or ribbons, of optical waveguides to waveguides disposed on printed circuit boards or backplanes. The described connectors can also be used to connect one or more optical waveguides, or ribbons of optical waveguides to optical transceiver modules. The provided connectors include expanded beam optics with non-contact optical mating to provide relaxed mechanical precision requirements for their construction, thus enabling low-cost injection molding and improved resistance to dirt. The provided connectors can have low optical loss, can be easily scalable to high channel count (optical fibers per connector), can provide safety to the user, and can be compatible with low insertion force blind mating. The provided connectors have suitability for use for backplane, front-plane, or mid-span connections.

In the following description, reference is made to the accompanying drawings that form a part hereof, and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with", "adjacent to", or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

Figure 1B:
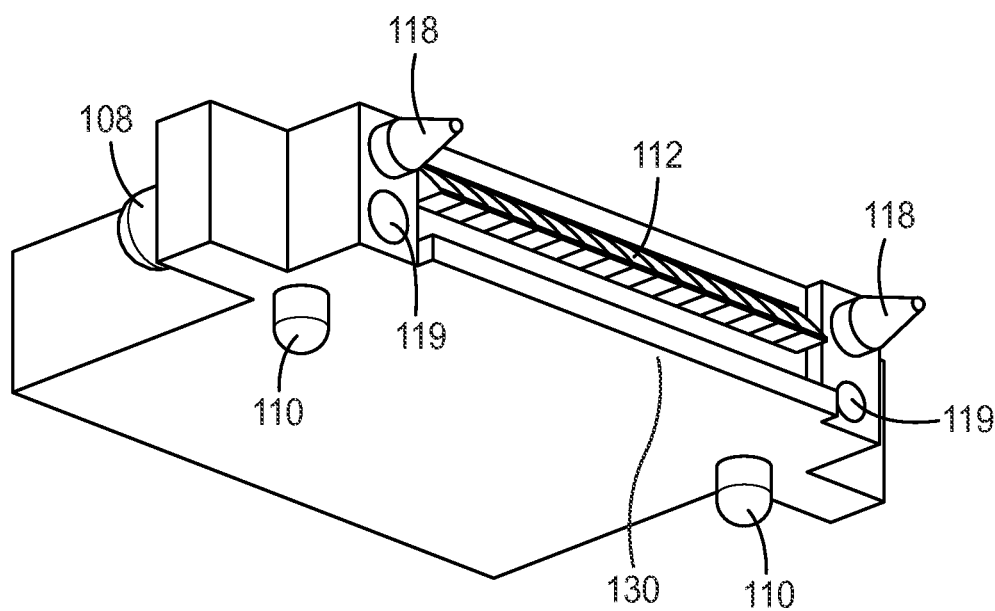

The provided connectors can be understood, but should not be limited by, the embodiment shown in FIGS. 1a and 1b. FIG. 1a is a top perspective view of an embodiment of a provided connector and FIG. 1b is a bottom perspective view of an embodiment of a provided connector. When in use, provided connectors such as this may be contained within a protective housing (not shown). Connector 100 includes first waveguide alignment member 114. First waveguide alignment member 114 provides a terminal or exit end for optical waveguides, such as optical fibers, and holds them securely and in alignment with light redirecting member 112. As shown here, first waveguide alignment member 114 includes a plurality of V-grooves to which optical waveguides, such as optical fibers, can be placed, aligned, and affixed. Typically, an adhesive can be used to permanently affix the optical waveguides. In some cases, the protective or buffer coating of the fiber is removed so that only the bare fiber is attached to alignment member 114. In such cases, the fiber segment still having the buffer coating may be attached to a buffer attachment area 115. Light redirecting member 112 includes a plurality of optical elements, one for each of a plurality of optical waveguides that can be affixed to first waveguide alignment member 114. In some cases, waveguide alignment member 114 includes at least one alignment feature for receiving and aligning a plurality of first optical waveguides that are integrated onto a common substrate. For example, in such cases, waveguide alignment member can receive and align a substrate that includes a plurality of embedded optical waveguides, or a plurality of optical waveguides formed on a top surface of the substrate. In some embodiments, the light redirecting member can include an injection molded polymer. The light redirecting member can also be protected within a housing. The housing can function to prevent dirt from interfering with optical connections. The housing can provide the retention force, e.g., via a spring mechanism, to maintain the registration features in positive contact, as well as a latching and release mechanism for mating and de-mating the connector. In addition, the housing can protect the connector from outputting stray light that can be a safety hazard to those nearby. In some embodiments, the housing can have a latching mechanism to prevent its accidental opening. In some embodiments, the housing can have a door mechanism that may be opened by the action of mating two connectors. The use of a housing can work well with loose-tube optical cables, and when a cable sheath is attached to the housing.

Connector 100 also includes first registration feature 118 and second registration feature 119 for mating with registration features of a mating connector. In the embodiment illustrated in FIGS. 1a-b connector 100 also shows first stacking alignment features 109 and second stacking alignment features 110 useful for vertically stacking and aligning couplers as, for example, in the construction of an array of connectors. Connector 100 can also have spring retention features 108. One or more springs may be used to provide force to keep two connectors mated. Connector 100 also includes beam blocking shelf 116 that is designed to keep any beam emitting from the fibers or light redirecting members from straying, for example, into the user's eyes. The underside or top surface of beam blocking shelf 116 can include a light-absorbing coating. When the connector is not mated, light exiting the output side of the first light redirecting member is blocked by the first beam blocking shelf.

Figure 2A:
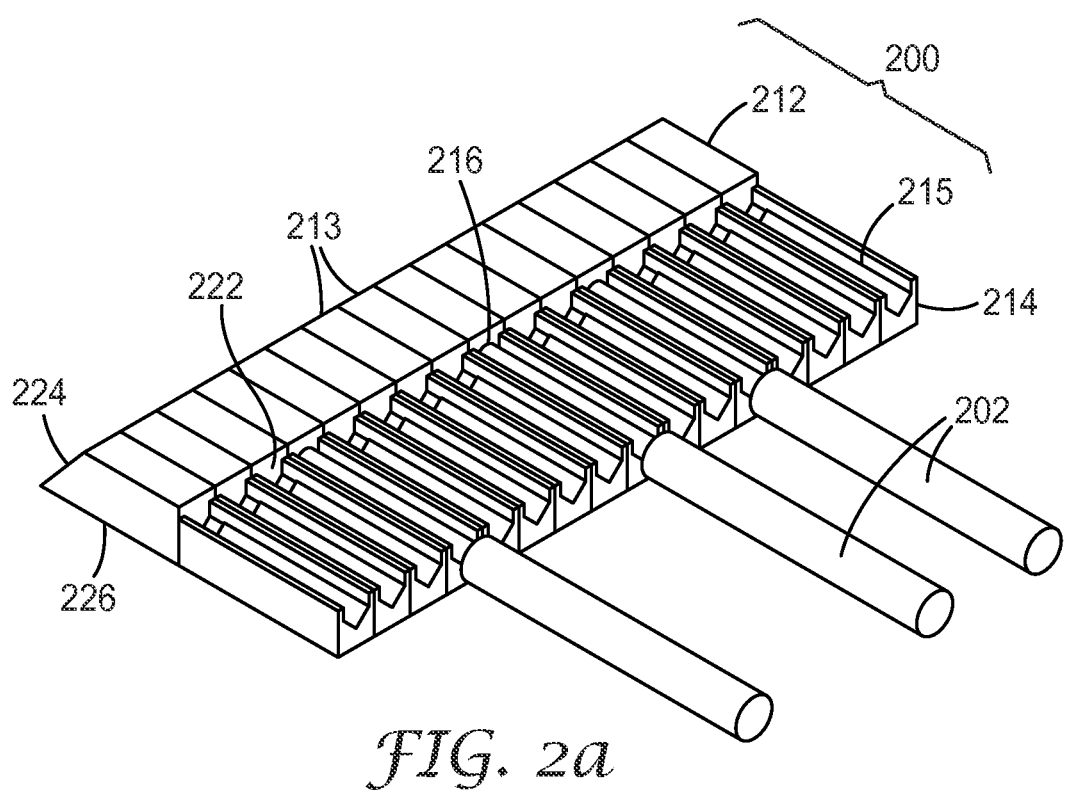
FIG. 2a is a perspective view of an optical waveguide alignment member and a light redirecting member.
Figure 2B:
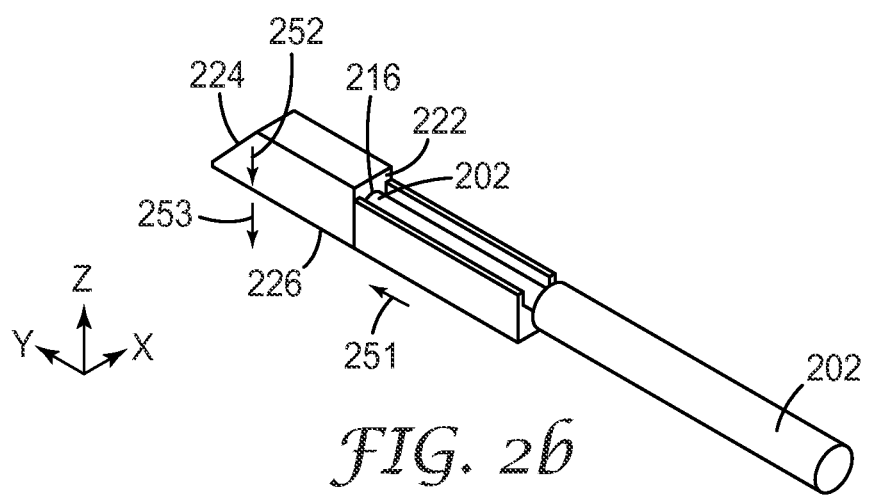

FIGS. 2a-b are cutaway views of a portion of a provided connector assembly focusing on the first waveguide alignment member and light redirecting member. FIG. 2a illustrates the attachment of several optical fibers 202 to connector 200. FIG. 2a is a cut-away perspective view of the waveguide alignment member 214 and light redirecting member 212 of the provided connector illustrated in FIG. 2a. Optical fibers 202 are aligned in grooves 215, typically V-grooves, to which they are permanently attached. The exit end of optical fibers 202 is situated so as to be able to direct light emanating from the optical fiber into the input side 216 or face of light redirecting member 212. Light redirecting member 212 includes an array of light redirecting elements 213, at least one for each optical fiber attached to connector 200. Typically, light redirecting element 213 includes a prism. Light redirecting member 212 includes an array of light redirecting elements 213, one for each of the plurality of optical waveguides 202 of a plurality of optical waveguides to be joined by connector 200.

Figure 3:
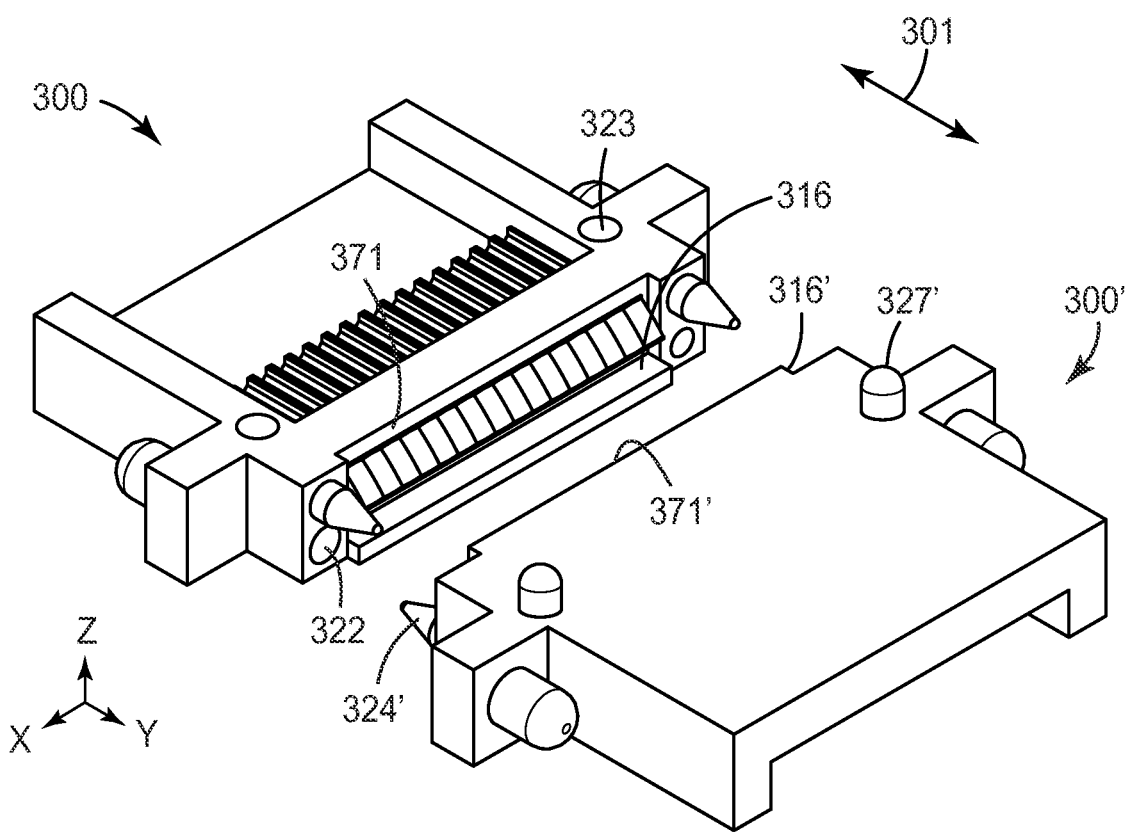
FIG. 3 is a perspective view of two provided connectors oriented in approximate position to mate.

FIG. 2b is a cutaway view of a portion of connector 200 that includes just one light directing element 213, one first waveguide alignment member, e.g. V-groove 215, and one optical fiber of plurality of optical fibers 202. In this illustration, one of the plurality of optical fibers 202 is aligned in groove 215 and may be permanently attached to it. At the point of attachment, the fiber buffer and protective coating (if any) have been stripped away to allow only the bare optical fiber to lie aligned and affixed to V-groove 215. Light redirecting element 213 includes light input side 222 for receiving input light from first optical waveguide (optical fiber) 202 disposed and aligned at waveguide alignment member 214. Light redirecting element 213 also includes light redirecting side 224 for receiving light from the input side along an input direction and redirecting (or turning) the received light along a different redirected direction. Light redirecting element 213 also includes output side 226 that receives light from light redirecting element 213 and transmits the received light as output light along an output direction toward an input side of a first light redirecting member of a mating connector (not shown in FIG. 2b but shown in FIG. 3). When the connector mates with a mating connector, it is configured so that the output side of the first light redirecting member faces the input side of the first light redirecting member of the mating connector and the first and second registration features of the connector (not shown in FIG. 2b but shown in FIG. 3) mate with the registration features of a mating connector. In some embodiments, a provided first connector can be configured to mate with a provided second connector. When a provided first connector is configured to mate with a provided second connector, the first and second connector can be so oriented relative to each other that the first and second registration features of the first connector mate with the respective second and first registrations features of the second connector as shown in FIG. 3. In some embodiments, when a provided connector mates with a mating connector, light from each first optical waveguide disposed and aligned at the connector can be coupled to a corresponding optical waveguide disposed and aligned at the mating connector. In some embodiments, a connector can be provided in which the first light redirecting member can have a same greater than one index of refraction between the input and the output sides.

FIG. 3 is an illustration of an embodiment of first mating connector 300 and second mating connector 300' in approximate position to mate. To mate, the two connectors are pushed together along a mating direction 301 parallel to the y-direction so that the first registration feature 322 of the first connector engages with the second registration feature 324' of the mating connector and the second registration feature of the first connector engages with the first registration feature of the mating connector. As first mating connector 300 approaches second mating connector 300', first beam blocking shelf 316 and second beam blocking shelf 316' form a protective shielded area keeping stray light that is not entering or exiting the light redirecting elements from scattering into, for example, the eye of a user or other person nearby.

The light from the output side of the first light redirecting element can be coupled to an identical, but inverted, second mated coupler as shown in FIG. 3. This light then follows a reverse path through the second light directing element in the second mated coupler and ultimately ends up in a second optical waveguide aligned and permanently attached to the second mated coupler. The overall result can be that when the connector mates with a mating connector, light from the first optical waveguide disposed and aligned at the connector can be coupled to a corresponding optical waveguide disposed and aligned at the mating connector. The connector can accommodate a plurality of optical waveguides that couple light into a plurality of light redirecting elements that are part of a light redirecting member. The alignment of the coupled connectors can be set by the engaging of registration features on the connectors as described earlier. In FIG. 3, connector 300 has a mating direction along the y-axis, the grooves in the first waveguide alignment member are oriented along the y-axis and perpendicular to the xz-plane, the input direction is along the y-axis and perpendicular to the xz-plane, the input side of the light redirecting member is parallel to the xz-plane and perpendicular to the y-axis, the light redirecting side is perpendicular to the yz-plane and makes an oblique, such as 45 degree, angle with the xy-plane, the redirected direction is along the negative z-direction, the output side of the light redirecting member is parallel to the xy-plane and perpendicular to the z-axis, and the output direction is along the negative z-direction. As such, the mating direction 301 of connector 300 is perpendicular to the output direction and parallel to the output side of light redirecting member.

In some embodiments, the operation of the provided connectors is as follows. Light confined to a first optical waveguide by total internal reflection propagates along the waveguide until it arrives at the exit end of the waveguide. The exit end of the first optical waveguide, as described above, is aligned and permanently affixed to a first alignment member of a first connector. The exit end of the first optical waveguide disposed and aligned at the connector is coupled into a light redirecting element which is part of a first light redirecting member for an array of optical waveguides. Light emanates from the end of the first optical waveguide, typically through a layer of index-matching gel or adhesive, and is received as input light at the input side of the first light redirecting element. Typically, the light redirecting elements comprise a prism. The input side, the light redirecting side, and the output side of the light redirecting element are typically different faces of the light redirecting element or, in some embodiments, a prism. The light redirecting element comprises materials that have index of refraction greater than 1 between the input and output sides. The light travels through the first light redirecting element and is redirected by the light redirecting side of the first light redirecting element in a different redirected direction than the direction of the light exiting the first optical waveguide. Typically, this can be about a 90 degree turn, although other angles are certainly possible and contemplated. In some embodiments, an input direction of light is along a lateral direction of the connector and the redirected direction is along a thickness direction of the connector. The first light redirecting side of the first light redirecting element can be a reflecting surface that is flat or, in some embodiments, the first light redirecting element can have a curved surface such as that of a lens. The curved surface can either focus or collimate the light. The redirected light can then be directed to an output side of the first light redirecting element where it can exit the first light redirecting element in a different output direction and, optionally, with a different beam diameter than when it entered the input side of the first light redirecting element. In some embodiments, at least one side of the input side and output side of the first light redirecting member can include an anti-reflection coating, e.g. a quarter wavelength layer of magnesium fluoride. In some embodiments, where each optical fiber can have a first core diameter, the output light associated with that first optical fiber can have a second diameter (expanded beam diameter) that is greater than the diameter of the first core diameter. The expanded beam diameter can be as a result of divergence of the beam from the fiber or, in some embodiments, from the curved surface on the light redirecting side of the light redirecting element. In some embodiments the output light can be a diverging light. In some embodiments, a half divergence angle of the diverging output light can be at least 2 degrees. In some embodiments the output light can be a converging light. In some embodiments, a half convergence angle of the converging output light can be at least 5 degrees. In some embodiments, the output light can be substantially collimated light. The substantially collimated light can have a half divergence or angle of the substantially collimated output light of less than 2 degrees.

Figure 4A:
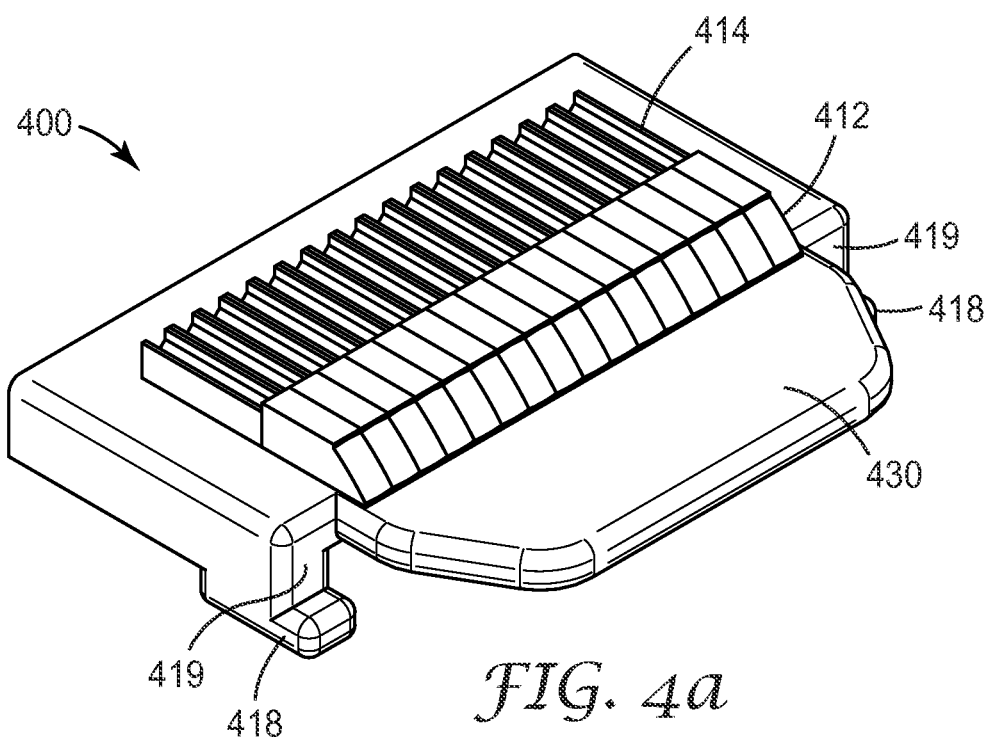
FIGS. 4a and 4b are top and bottom perspective views of another embodiment of a provided connector.
Figure 4B:
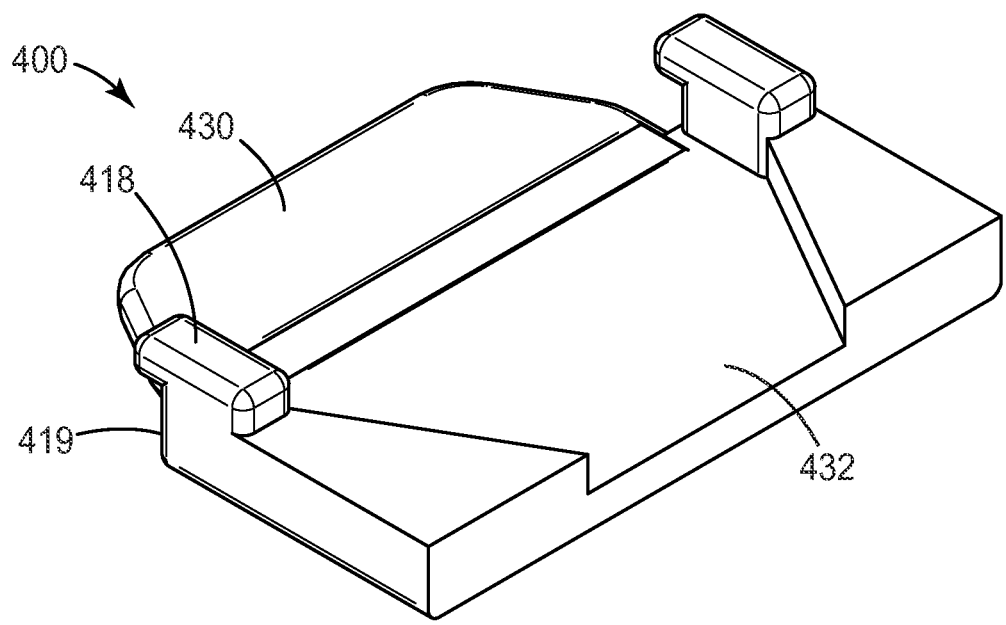

FIGS. 4a and 4b are top and bottom perspective views of another embodiment of a provided connector. Connector 400 has an extended alignment feature, tongue 430, extending forward from the front of the connector and a tongue-shaped recess 432 on the opposite side of the connector. When two of these connectors mate, the mated connector is flipped vertically and is coupled with the first connector so that the tongue of one connector engages in the recess of the other connector and vice versa. Connector 400 also has first waveguide alignment member 414 and light redirecting member 412 that turns the light approximately 90 degrees. When connector 400 is mated with an identical mating connector, alignment protrusions (first registration feature)

418 on one connector engage in alignment recesses (second registration feature) 419 of the mating connector.

The provided connectors can have mutually orthogonal length, width, and thickness directions as well as a mating direction for mating with a mating connector. For example, in FIG. 3, connector 300 has a length direction along the y-axis, a width direction along the x-axis, and a thickness direction along the z-axis where x-, y-, and x-axes are mutually orthogonal. In addition, connector 300 has a mating direction 301 along the y-axis. In some embodiments, the mating direction can be along the length direction. For example, in FIG. 3, mating direction 301 and the length direction of connector 300 are both along the y-axis. In some embodiments, the provided connectors can have a mating face, such as mating face 371, for engaging a mating face, such as mating face 371', of a mating connector and a mating direction, such as mating direction 301, for mating with the mating connector, the mating direction 301 being perpendicular to the mating face 371 and mating face 371'. In some embodiments, the provided connectors have a mating direction for mating with a mating connector wherein the mating direction is along the input direction and wherein the redirected direction is substantially perpendicular to the input direction. For example, in FIG. 2b, the input direction 251 is along the y-axis, the input face 222 is parallel to xz-plane and perpendicular to the y-axis, the light redirecting side 224 is perpendicular to the yz-plane and makes and oblique, such as 45 degree, angle with the xy-plane, the redirected direction 252 is along the negative z-axis, and the output direction 253 is along the negative z-axis. In some cases, the oblique angle between the light redirecting side and the xy-plane can be at least 10 degrees, or at least 20 degrees, or at least 30 degrees. In some cases, the oblique angle between the light redirecting side and the xy-plane can be between 30 to 60 degrees, or between 35 to 55 degrees, or between 40 to 50 degrees. In some cases, the light redirecting side is planar. In some cases, the light redirecting side is curved. In some embodiments, the mating direction 301 and the input direction 251 can be along the length direction (y-axis) and the redirected direction 252 can be along the thickness direction (z-axis).

For mating, the provided connectors can include two first registration features and two second registration features for mating with alignment members of a mating connector. Two provided connectors (a first connector and a second identical connector) can be mated so that the second connector is flipped vertically relative to the first connector with the two first and the two second registration features of the first connector mating with the respective two second and two first registration features of the second connector. The two first and two second registration features on a provided connector can be arranged at the four corners of a rectangle. The second registration feature can be below the first registration feature.

In some embodiments, provided connectors comprising first and second stacking registration features can be stacked in a vertical direction of the connector with the first stacking registration feature of an upper connector mating with the second stacking registration feature of a lower connector. In some embodiments, the first stacking registration feature can be a protrusion. In some embodiments, the second stacking registration feature can be a recess. For example, each of connectors 300 and 300' in FIG. 3 includes vertical stacking registration features 323 and 327' where the 323 feature is a recess and the 327' feature is a protrusion. In some embodiments, the provided connector can comprise a plurality of first stacking registration features and a plurality of second stacking registration features, such that the connector can be stacked in a vertical direction of the connector with each first stacking registration feature of an upper connector mating with a corresponding second stacking registration feature of a lower connector. In some embodiments, provided connectors can be configured to mate with non-identical mating connectors.

Figure 7:
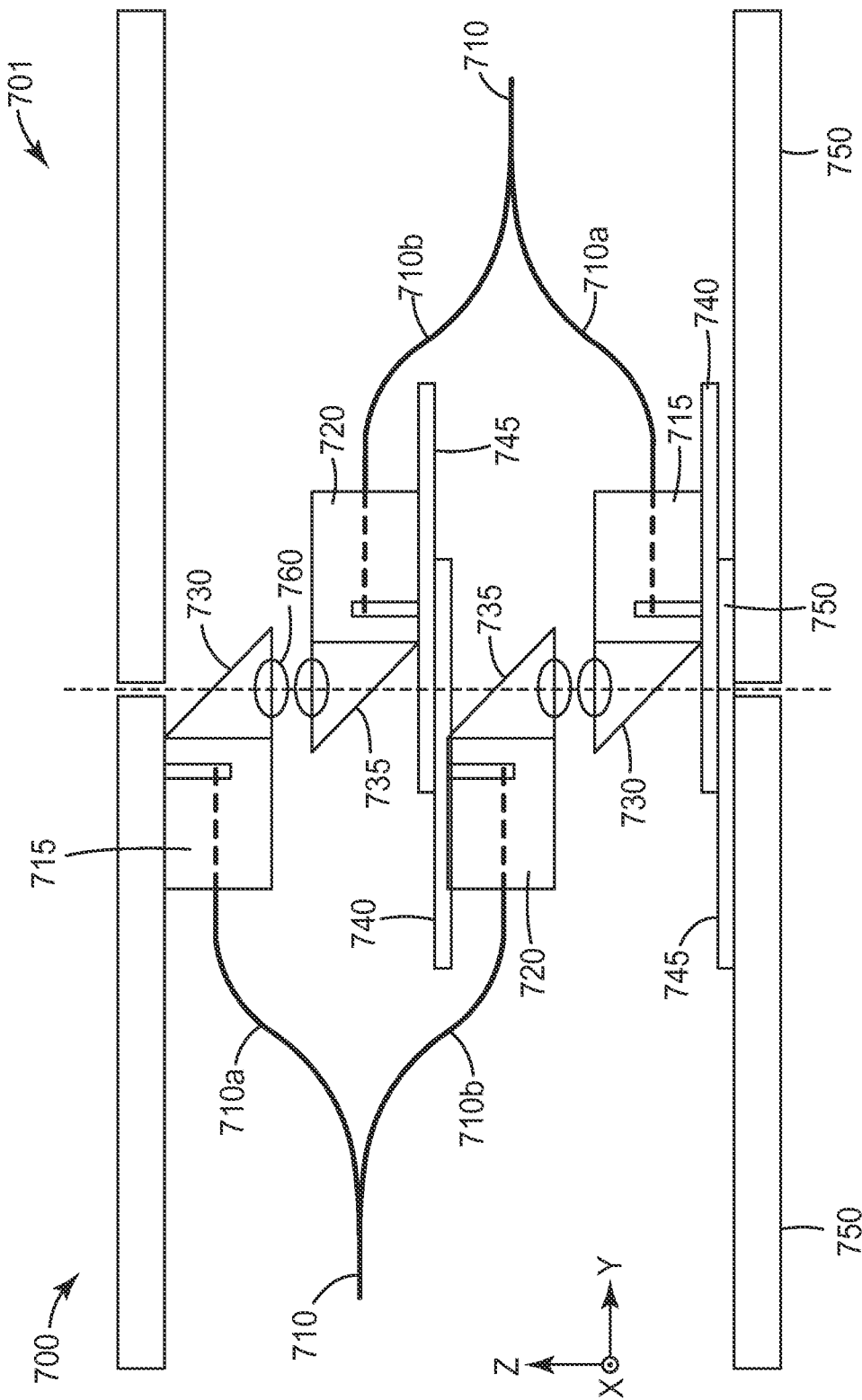
FIG. 7 is an illustration of mating between two vertically staggered connectors.

In some embodiments of provided connectors that include a plurality of optical waveguides a second waveguide alignment member can be vertically offset from the first waveguide alignment member for receiving and aligning at least one second optical waveguide. In this embodiment, a second light redirecting member can be vertically offset from the first light redirecting member. The second light redirecting member can include an input side for receiving light from a second optical waveguide disposed and aligned at the second waveguide alignment member, a light redirecting side for receiving light from the input side along the input direction and redirecting the received light along the redirected direction, and an output side for receiving light from the light redirecting side and transmitting the received light as output light in an output direction toward an input side of a second light redirecting member of a mating connector. In this embodiment, the connector can be configured so that when the connector mates with the mating connector, the output side of the second light redirecting member faces the input side of the first light redirecting member of the mating connector. In some embodiments, the provided connector can be configured to receive the at least one first optical waveguide from a first optical cable (for example, an optical fiber ribbon) and the at least one second optical waveguide from a different second optical cable. For example, FIG. 7 is a schematic side view of a connector 700 mating with a similar connector 701 along a mating direction that is along the y-axis. Each connector includes a connector housing 750. Each connector further includes a first waveguide alignment member 715 receiving a waveguide 710a from a waveguide bundle 710 and a first light redirecting member 730 for redirecting light from waveguide 710a. The light redirecting member 730 also include a lens 760 for changing the divergence of light exiting waveguide 710a. Each connector also includes a second waveguide alignment member 720 which is vertically offset along the z-axis relative to the first waveguide alignment member 715 within the housing 750 and which receives a waveguide 710b from the waveguide bundle 710, and a second light redirecting member 735 which is vertically offset along the z-axis relative to the first light redirecting member 730 within the housing 750 and which redirects light exiting waveguide 710b. In some cases, connector 701 can be the same as connector 700 except that it is flipped vertically so that the two connectors can mate along the y-axis mating direction. In some cases, connector 701 may be different from connector 700.

In some cases, connector 700 includes a row of first waveguide alignment members 715 and first light redirecting members 730 extending along the x-axis, and a row of second waveguide alignment members 720 and second light redirecting members 735 also extending along the x-axis. In such cases, the two rows are vertically offset from each other along the z-axis or the thickness direction of the connector. In some cases, at least one of the connectors 700 and 701 includes light blocks so that when the connector is not mated with a mating connector, light exiting the output side of the light redirecting member is blocked by the light block. For example, connector 700 includes a first light block 740 for blocking light exiting the first light redirecting member 730 and a second light block 745 for blocking light exiting the second light redirecting member 735. In some cases, a light redirecting member in a connector is a unitary construction. For example, in some cases, each of the light redirecting members 730 and 735 is a unitary construction meaning that the light redirecting member does not have any internal interfaces, joints, or seams. In some cases, a unitary structure or construction is capable of being formed in a single forming step such as machining, casting or molding.

In some embodiments, the second waveguide alignment member and the second light redirecting member can be vertically offset in a same direction from the first waveguide alignment member and the first light redirecting member. In some embodiments, the provided connector can include the first and second waveguide alignment members, the first and second light redirecting members, and the registration features being a unitary construction. In some embodiments, the provided connector can include a first light block vertically offset from a second light block, so that when the connector is not mated with a mating connector, light exiting the output side of the first light redirecting member is blocked by the first light block and light exiting the output side of the second light redirecting member is blocked by the second light block. In some embodiments, the first waveguide alignment member can include a first plurality of waveguide alignment elements and the second waveguide alignment member can include a second plurality of waveguide alignment elements, each waveguide alignment element in the first plurality of waveguide alignment elements being configured to receive and align a different first optical waveguide, each waveguide alignment element in the second plurality of waveguide alignment elements being configured to receive and align a different second optical waveguide, each waveguide alignment element in the first plurality of waveguide alignment elements being vertically and horizontally offset from each waveguide alignment element in the second plurality of waveguide alignment elements. In some embodiments of the provided connector, the first light redirecting member can include a first plurality of light redirecting elements and the second light redirecting member can include a second plurality of light redirecting elements, each light redirecting element in the first plurality of light redirecting elements corresponding to a different first optical waveguide received and aligned at the first waveguide alignment member, each light redirecting element in the second plurality of light redirecting elements corresponding to a different second optical waveguide received and aligned at the second waveguide alignment member, each light redirecting element in the first plurality of light redirecting elements being vertically and horizontally offset from each light redirecting element in the second plurality of light redirecting elements.

In some embodiments, a connector is provided that includes a second waveguide alignment member that can be vertically offset from the first waveguide alignment member for receiving and aligning at least one second optical waveguide. In these embodiments, the input side of the first light redirecting member can receive input light from a first optical waveguide disposed and aligned at the first waveguide alignment member at a first location on the input side, and a second optical waveguide disposed and aligned at the second waveguide alignment member at a different second location on the input side, the second location being vertically offset from the first location. The light redirecting side of the first light redirecting member can receive light from the first location on the input side at a first location on the light redirecting side, and the second location on the input side at a different second location on the light redirecting side. The output side of the first light redirecting member can receive light from the first location on the light redirecting side and can transmit the received light as output light from a first location on the output side, and the second location on the light redirecting side and can transmit the received light as output light from a different second location on the output side. In some embodiments, a connector is provided wherein the second location on the input side can be vertically offset from the first location on the input side. In other embodiments, a connector is provided wherein the second location on the light redirecting side can be vertically and horizontally offset from the first location on the light redirecting side. In some embodiments, a connector is provided wherein the second location on the output side can be horizontally offset from the first location on the output side. In some embodiments, a connector is provided wherein the light redirecting side of the first light redirecting member can include features at at least one of the first and second locations on the light redirecting side so that the output lights from the first and second locations on the output side are substantially collimated, have a same divergence angle, or have a same convergence angle. The features can include reflective lenses.

Figure 5:
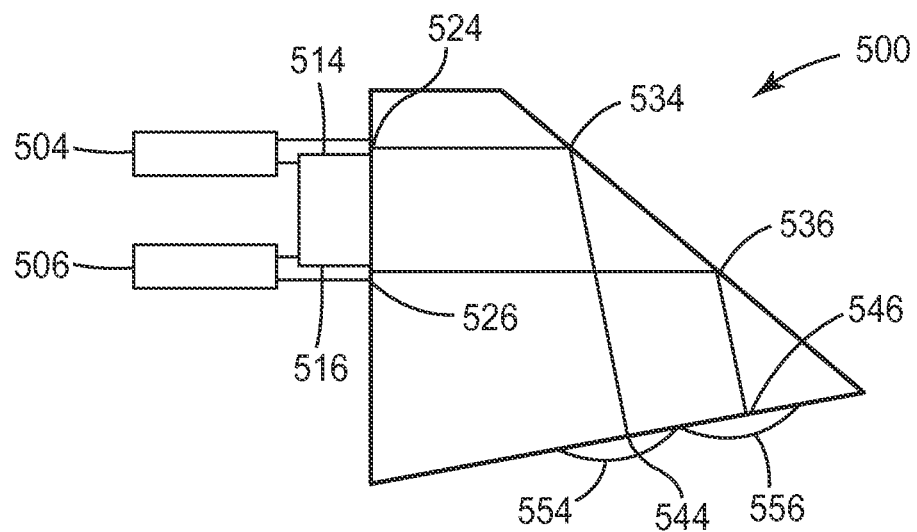
FIG. 5 is an illustration of an exemplary light redirecting member of a provided connector.

FIG. 5 is a drawing of an embodiment of single light redirecting member. Light redirecting member 500 has an input side that receives light from first optical waveguide 504 disposed and aligned at first waveguide alignment member 514 at first input location 524 and second optical waveguide 506 disposed and aligned at second waveguide alignment member 516 at second input location 526. Second input location 526 is vertically offset from first input location 524. Light from first optical waveguide 504 and second optical waveguide 506 follow the illustrated paths through light redirecting 500 until they hit first and second locations 534 and 536 on the light redirecting side of the single light redirecting member respectively. The light is then reflected to follow different paths so that the light originally from first optical waveguide 504 is directed to first output location 544 and the light originally from second optical waveguide 506 is directed to a second output location 546. Single light redirecting member 500 can include a first optical element with a first curved surface 554 and/or a second optical element with a second curved surface 556 coupled to light from first output location 544 and second output location 546 respectively. First optical element with first curved surface 554 and second optical element with second curved surface 556 can focus, collimate, or diverge the light coming from the respective output locations.

The optical waveguides 504 and 506 in FIG. 5 are vertically offset relative to each other. In general, two or more optical waveguides, such as two or more optical fibers, can be vertically offset relative to each other. In some cases, curved surfaces 554 and 556 are optical lenses closely packed on the output side of the light redirecting member. In some cases, the lenses are circular and the diameter of each lens is 150 microns, or 180 microns, or 200 microns, or 250 microns, or 300 microns, or 350 microns, or 400 microns, or 450 microns, or 500 microns. In some cases, the lenses are arranged in a closely packed array, such as a square, a rectangular, or a hexagonal closely packed array.

Figure 6:
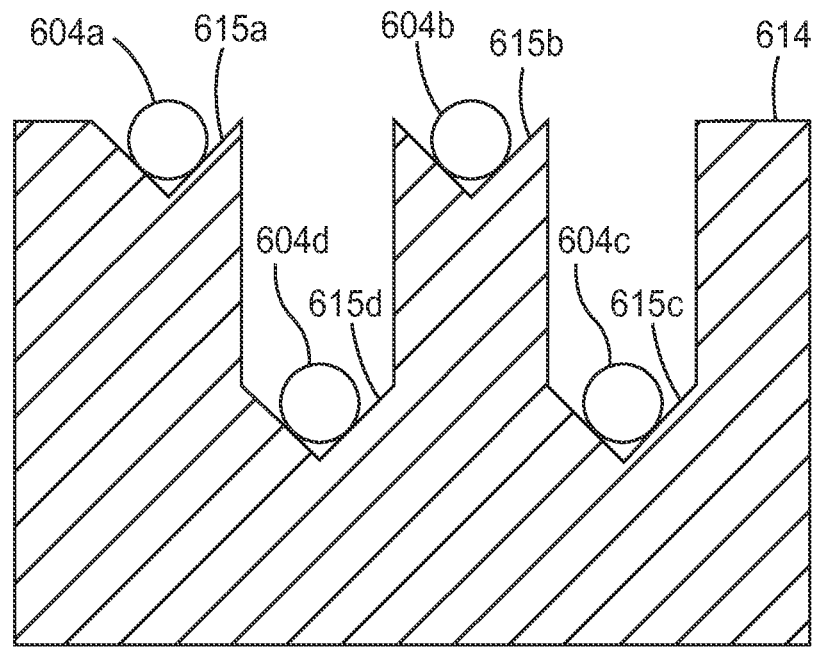
FIG. 6 is an illustration of a cross-section of an embodiment of vertically-staggered optical waveguides at the input side of the light redirecting member.

FIG. 6 is an illustration of a cross-section of vertically-staggered optical waveguides at the input side of a light redirecting member and its corresponding waveguide alignment member. In particular, optical waveguides, such as optical fibers, 604a-604d are received and aligned in respective V-grooves 615a-615d of waveguide alignment member 614. The waveguides are vertically and horizontally offset relative to each other.

A connector assembly is also provided and includes a waveguide alignment member for receiving and aligning first and second optical waveguides. The provided connector assembly can include an input side that can receive first and second input lights from the first and second optical waveguides along respective first and second incident directions at respective first and second locations on the input side and transmitting the received lights as respective first and second transmitted lights. The provided connector assembly also can include a first light redirecting side that can receive the first and second transmitted lights at respective first and second locations on the light redirecting side and redirecting the received lights as respective first and second redirected lights along respective first and second redirected directions, the first redirected direction being different than the first incident direction, the second redirected direction being different than the second incident direction. Additionally, the provided connector assembly can include an output side that can receive the first and second redirected lights at respective first and second locations on the output side and transmit the received lights as respective first and second output lights toward an input side of a first light redirecting member of a mating connector, the connector being configured so that when the connector mates with the mating connector, the output side of the connector is parallel to and faces the input side of the mating connector. The provided connector assembly can also include first and second registration features for mating with registration features of a mating connector. In some embodiments, the provided connector assembly can have mutually orthogonal length, width, and thickness directions, the first redirected direction being along the thickness direction and perpendicular to the first incident direction, the second redirected direction being along the thickness direction and perpendicular to the second incident direction. In other embodiments, the provided connector assembly can have mutually orthogonal length, width, and thickness directions, the first and second locations on the input side being offset from each other along at least one of width and thickness directions. In yet other embodiments, the provided connector assembly can have mutually orthogonal length, width, and thickness directions, the first and second locations on the light redirecting side being offset from each other along at least one of width and thickness directions.

In some embodiments, any connector disclosed herein, is configured to mate with a similar connector. In some embodiments, any connector disclosed herein, is hermaphroditic meaning it is configured to mate with itself.

Figure 8:
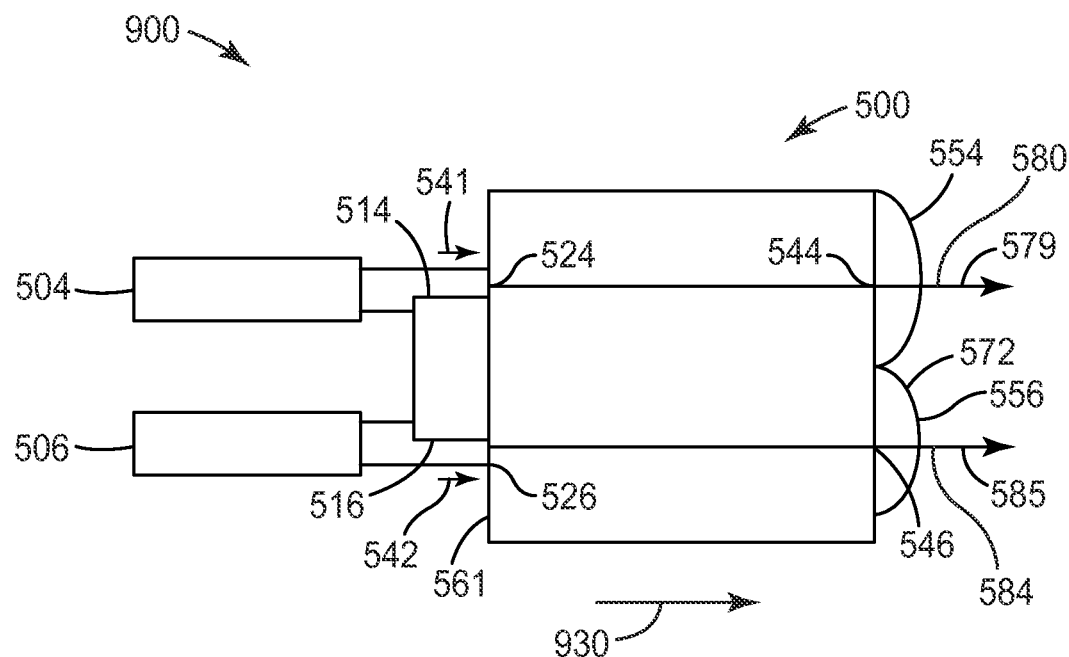
FIG. 8 is an illustration of a side view of an embodiment of a provided connector.
Figure 9:
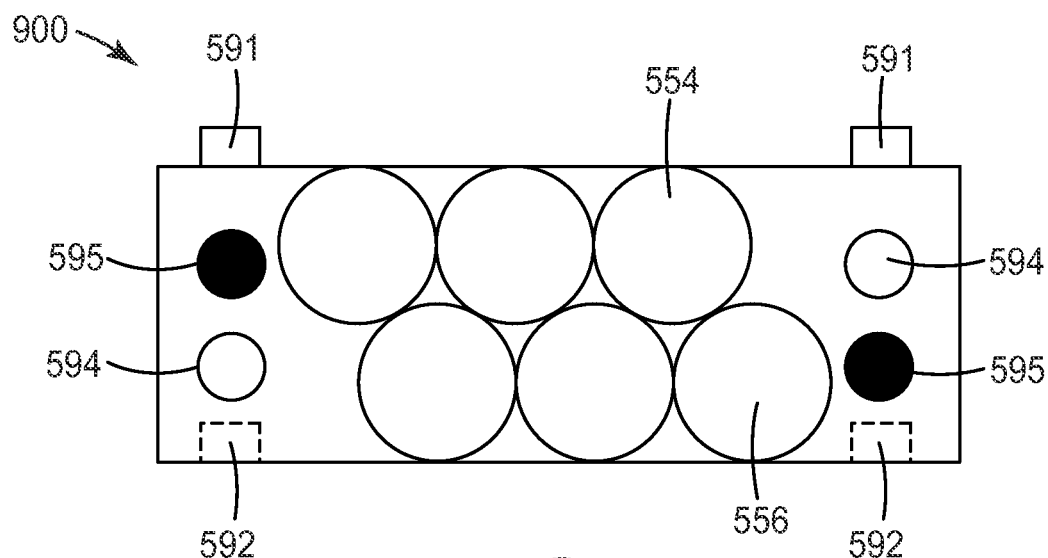
FIG. 9 is an illustration of an end view of the connector shown in FIG. 8.

FIGS. 8 and 9 are schematic side and end view of an exemplary connector 900 that includes a single unitary light redirecting member and is adapted to receive vertically staggered optical waveguides, such as optical fibers. In particular, connector 900 includes a first waveguide alignment member 514 for receiving and aligning at least one first optical waveguide 504 and a second waveguide alignment member 516 that is vertically offset from the first waveguide alignment member 514 and is adapted to receive and align at least one second optical waveguide 506. In some cases, the first waveguide alignment member 514 is adapted to receive a plurality of first optical waveguides 504 and align the first optical waveguides in a first row of the first optical waveguides, and the second waveguide alignment member 516 is adapted to receive a plurality of second optical waveguides 506 and align the second optical waveguides in a second row of the second optical waveguides, where the second row is parallel to and vertically offset from the first row.

Connector 900 further includes a first light redirecting member 500 that has a unitary construction and includes an input side 561 and an output side 572 that, in some cases, such as when the input and output sides are both planar or substantially parallel, is parallel to the input side. The input side 561 is adapted to receive input light from a first optical waveguide 504 disposed and aligned at the first waveguide alignment member 514 along a first input direction 541 at a first location 524 on the input side and from a second optical waveguide 506 disposed and aligned at the second waveguide alignment member 516 along a second input direction 542 at a second location 526 on the input side. The second location 526 is vertically offset from the first location 524. In some cases, the first and second locations 524 and 526 on the input side 561 are also horizontally offset from each other. In some cases, the first input direction 541 is parallel to the second input direction 542.

The output side 572 is adapted to receive light from the first location 524 on the input side 561 and transmit the received light as output light 579 from a first location 544 on the output side 572 along a first output direction 580 and from the second location 526 on the input side 561 and transmit the received light as output light 584 from a second location 546 on the output side 572 along a second output direction 585, where the second location 546 is different than the first location 544. In some cases, the first and second locations 544 and 546 on the output side 572 are vertically offset from each other. In some cases, the first and second locations 544 and 546 on the output side 572 are horizontally offset from each other. In some cases, the first output direction 580 is parallel to the second output direction 585. In some cases, the first output direction 580 is parallel to the first input direction 541 and the second output direction 585 is parallel to the second input direction 542. In some cases, all output direction and all input directions are parallel.

In some cases, the first waveguide alignment member 514, the second waveguide alignment member 516, and the first light redirecting member 500 form a unitary construction.

In some cases, the output side 572 is configured to change the divergence of light that the output side receives from the input side 561. In such cases, the output side may, for example, include one or curved surfaces such as a first curved surface 554 for changing the divergence of light exiting the corresponding optical waveguide 504 and a second curved surface 556 for changing the divergence of light exiting the corresponding optical waveguide 506. In some cases, connector 900 includes a plurality of discrete optical lenses, such as optical lenses 554 and 556, each discrete optical lens corresponding to a different optical waveguide received and aligned at the first and second waveguide alignment members 514 and 516, where each discrete optical lens is configured to change the divergence of light exiting the optical waveguide that corresponds to the discrete optical lens.

Connector 900 is configured to mate with a mating connector along a mating direction 930. In some cases, the mating direction 930 is parallel to at least one of the first and second output directions 580 and 585. In some cases, the mating direction 930, the first output direction 580, and the second output direction 585 are parallel. Connector 900 includes at least one registration feature, such as two protrusion features 595 and two recess features 594 for mating with corresponding registration features of a mating connector. Connector 900 further includes vertical stacking features 591, such as protrusions 591, and vertical stacking features 592, such as recesses 592, for vertical stacking of the connector. The stacking registration features provide for the vertical stacking of the connector. For example, in a vertical stacking of a first connector 900 with a second connector 900, stacking registration features 591 of the first connector 900 engage the stacking registration features 592 of the second connector 900.

In some embodiments, connector 900 further includes a housing, not expressly shown in FIGS. 8 and 9, that houses the light redirecting member 500. In such cases, features 591, 592, 594, and 595 can be formed in the housing. In some cases, connector 900 is configured to mate with another connector similar to connector 900. In some cases, connector 900 is hermaphroditic meaning that is configured to mate with itself.

Following are a list of embodiments of the present disclosure.

Item 1 is a connector comprising:
a first waveguide alignment member for receiving and aligning at least one first optical waveguide;
a first light redirecting member comprising:
an input side for receiving input light along an input direction from a first optical waveguide disposed and aligned at the first waveguide alignment member;
a light redirecting side for receiving light from the input side along the input direction and redirecting the received light along a different redirected direction; and
an output side for receiving light from the light redirecting side and transmitting the received light as output light exiting the first light redirecting member along an output direction toward an input side of a first light redirecting member of a mating connector, the first light redirecting member having a greater than one refractive index between the input and output sides; and
first and second registration features for mating with registration features of a mating connector along a connector mating direction different than the output direction.

Item 2 is a first connector of item 1 being configured to mate with a second connector of item 1.

Item 3 is a first connector of item 1 mating with a second connector of item 1, wherein the first and second connectors are so oriented relative to each other that the first and second registration features of the first connector mate with the respective second and first registration features of the second connector.

Item 4 is the connector of item 1, wherein when the connector mates with a mating connector, light from each first optical waveguide disposed and aligned at the connector is coupled to a corresponding optical waveguide disposed and aligned at the mating connector.

Item 5 is the connector of item 1, further comprising at least one first lens, each first lens being associated with a different first optical waveguide and configured to change a divergence of light from the first optical waveguide, such that when the connector mates with a mating connector, each first lens is optically aligned with a corresponding lens of the mating connector.

Item 6 is the connector of item 1, wherein the first light redirecting member has a same greater than one index of refraction between the input and output sides.

Item 7 is the connector of item 1, wherein the first waveguide alignment member is configured to receive and align a plurality of first optical waveguides.

Item 8 is the connector of item 1, wherein the at least one first optical waveguide comprises at least one first optical fiber.

Item 9 is the connector of item 1, wherein the first waveguide alignment member comprises at least one groove.

Item 10 is the connector of item 1, wherein the first waveguide alignment member comprises a first plurality of waveguide alignment elements, each waveguide alignment element being configured to receive and align a different first optical waveguide.

Item 11 is the connector of item 10, wherein each waveguide alignment element comprises a groove.

Item 12 is the connector of item 1, wherein the first light redirecting member comprises a first plurality of light redirecting elements, each light redirecting element corresponding to a different first optical waveguide received and aligned at the first waveguide alignment member and comprising:
an input face for receiving input light from the first optical waveguide along an input direction;
a light redirecting face for receiving light from the input face along the input direction and redirecting the received light along a different redirected direction; and
an output face for receiving light from the light redirecting face and transmitting the received light as output light along an output direction toward an input side of a first light redirecting member of a mating connector.

Item 13 is the connector of item 12, wherein:
the input side of the first light redirecting member comprises the input face of each light redirecting element,
the output side of the first light redirecting member comprises the output face of each light redirecting element, and
the light redirecting side of the first light redirecting member comprises the light redirecting face of each light redirecting element.

Item 14 is the connector of item 12, wherein the light redirecting elements in the first plurality of light redirecting elements form a row of light redirecting elements.

Item 15 is the connector of item 12, wherein each light redirecting element comprises a prism.

Item 16 is the connector of item 15, wherein:
the input side of the first light redirecting member comprises a first face of the prism in each light redirecting element,
the output side of the first light redirecting member comprises a second face of the prism in each light redirecting element, and
the light redirecting side of the first light redirecting member comprises a third face of the prism in each light redirecting element.

Item 17 is the connector of item 1, wherein at least one of the input side and output side of the first light redirecting member comprises an anti-reflection coating.

Item 18 is the connector of item 1 having a mating face for engaging a mating face of a mating connector, the first light redirecting member being at the mating face of the connector.

Item 19 is the connector of item 1, wherein the first waveguide alignment member, the first light redirecting member, and the registration features form a unitary construction.

Item 20 is the connector of item 1, wherein the input direction is along a lateral direction of the connector and the redirected direction is along a thickness direction of the connector.

Item 21 is the connector of item 1, wherein at least one of the input side, the light redirecting side, and the output side of the first light redirecting member comprises a curved surface.

Item 22 is the connector of item 1 comprising a first light block so that when the connector is not mated with a mating connector, light exiting the output side of the first light redirecting member is blocked by the first light block.

Item 23 is the connector of item 1, wherein the first registration feature comprises a protrusion.

Item 24 is the connector of item 1, wherein the second registration features comprises a recess.

Item 25 is the connector of item 1 comprising a mating face for engaging a mating face of a mating connector, the first and second registration features being at the mating face of the connector.

Item 26 is the connector of item 1 comprising two first registration features and two second registration features for mating with alignment members of a mating connector.

Item 27 is the connector of item 26, wherein the first and second registration features are arranged at the four corners of a rectangle.

Item 28 is the connector of item 1, wherein the second registration feature is below the first registration feature.

Item 29 is the connector of item 1 being configured to mate with a non-identical mating connector.

Item 30 is the connector of item 1, further comprising:
a second waveguide alignment member vertically offset from the first waveguide alignment member for receiving and aligning at least one second optical waveguide; and
a second light redirecting member vertically offset from the first light redirecting member and comprising:
an input side for receiving input light along an input direction from a second optical waveguide disposed and aligned at the second waveguide alignment member;
a light redirecting side for receiving light from the input side along the input direction and redirecting the received light along a different redirected direction; and
an output side for receiving light from the light redirecting side and transmitting the received light as output light exiting the second light directing member along an output direction toward an input side of a second light redirecting member of a mating connector, the connector being configured so that when the connector mates with the mating connector, the output side of the second light redirecting member faces the input side of the second light redirecting member of the mating connector.

Item 31 is the connector of item 30, wherein the second waveguide alignment member and the second light redirecting member are vertically offset in a same direction from the first waveguide alignment member and the first light redirecting member.

Item 32 is the connector of item 30 wherein the first and second waveguide alignment members, the first and second light redirecting members, and the first and second registration features form a unitary construction.

Item 33 is the connector of item 30 comprising a first light block vertically offset from a second light block, so that when the connector is not mated with a mating connector, light exiting the output side of the first light redirecting member is blocked by the first light block and light exiting the output side of the second light redirecting member is blocked by the second light block.

Item 34 is the connector of item 30, wherein the first waveguide alignment member comprises a first plurality of waveguide alignment elements and the second waveguide alignment member comprises a second plurality of waveguide alignment elements, each waveguide alignment element in the first plurality of waveguide alignment elements being configured to receive and align a different first optical waveguide, each waveguide alignment element in the second plurality of waveguide alignment elements being configured to receive and align a different second optical waveguide, each waveguide alignment element in the first plurality of waveguide alignment elements being vertically and horizontally offset from each waveguide alignment element in the second plurality of waveguide alignment elements.

Item 35 is the connector of item 30, wherein the first light redirecting member comprises a first plurality of light redirecting elements and the second light redirecting member comprises a second plurality of light redirecting elements, each light redirecting element in the first plurality of light redirecting elements corresponding to a different first optical waveguide received and aligned at the first waveguide alignment member, each light redirecting element in the second plurality of light redirecting elements corresponding to a different second optical waveguide received and aligned at the second waveguide alignment member, each light redirecting element in the first plurality of light redirecting elements being vertically and horizontally offset from each light redirecting element in the second plurality of light redirecting elements.

Item 36 is the connector of item 1, further comprising:
a second waveguide alignment member vertically offset from the first waveguide alignment member for receiving and aligning at least one second optical waveguide, wherein:
the input side of the first light redirecting member receives input light from: a first optical waveguide disposed and aligned at the first waveguide alignment member at a first location on the input side, and a second optical waveguide disposed and aligned at the second waveguide alignment member at a different second location on the input side, the second location being vertically offset from the first location,
the light redirecting side of the first light redirecting member receives light from: the first location on the input side at a first location on the light redirecting side, and the second location on the input side at a different second location on the light redirecting side, and
the output side of the first light redirecting member receives light from: the first location on the light redirecting side and transmits the received light as output light from a first location on the output side, and the second location on the light redirecting side and transmits the received light as output light from a different second location on the output side.

Item 37 is the connector of item 36, wherein the second location on the input side is vertically offset from the first location on the input side.

Item 38 is the connector of item 36, wherein the second location on the light redirecting side is vertically and horizontally offset from the first location on the light redirecting side.

Item 39 is the connector of item 36, wherein the second location on the output side is horizontally offset from the first location on the output side.

Item 40 is the connector of item 36, wherein the light redirecting side of the first light redirecting member comprises features at at least one of the first and second locations on the light redirecting side so that the output lights from the first and second locations on the output side are substantially collimated, have a same divergence angle, or have a same convergence angle.

Item 41 is the connector of item 40, wherein the features comprise reflective lenses.

Item 42 is the connector of item 36, wherein the output side of the first light redirecting member comprises features at at least one of the first and second locations on the output side so that the output lights from the first and second locations on the output side are substantially collimated, have a same divergence angle, or have a same convergence angle.

Item 43 is the connector of item 42, wherein the features comprise transmissive lenses.

Item 44 is the connector of item 36, wherein an optical path from the first location on the input side of the first light redirecting member to the first location on the output side of the first light redirecting member is substantially equal to an optical path from the second location on the input side of the first light redirecting member to the second location on the output side of the first light redirecting member.

Item 45 is the connector of item 1, wherein the first waveguide alignment member comprises at least one alignment feature for receiving and aligning a plurality of first optical waveguides integrated onto a common substrate.

Item 46 is the connector of item 1, wherein the first light redirecting member is a unitary construction.

Item 47 is the connector of item 1, wherein the connector mating direction is perpendicular to the output direction.

Item 48 is the connector of item 1, wherein the connector mating direction is parallel to the output side of the light redirecting member.

Item 49 is a connector of item 1 comprising at least one alignment feature disposed on at least one of a top and bottom surfaces of the connector for a vertical stacking of the connector.

Item 50 is the connector of item 1 comprising a protrusion and a recess on a top surface of the connector for a vertical stacking of the connector.

Item 51 is the connector of item 50 vertically stacked on another connector of item 50.

Item 52 is a connector assembly comprising:
a connector receiving and aligning first and second optical waveguides and comprising:
an input side for receiving first and second input lights from the first and second optical waveguides along respective first and second input directions at respective first and second locations on the input side and transmitting the received lights as respective first and second transmitted lights;
a first light redirecting side for receiving the first and second transmitted lights at respective first and second locations on the light redirecting side and redirecting the received lights as respective first and second redirected lights along respective first and second redirected directions, the first redirected direction being different than the first input direction, the second redirected direction being different than the second input direction; and
an output side for receiving the first and second redirected lights at respective first and second locations on the output side and transmitting the received lights as respective first and second output lights along a respective first and second output direction toward an input side of a first light redirecting member of a mating connector, light travelling from the input side to the output side experiencing a greater than one refractive index, the connector being configured so that when the connector mates with the mating connector, the output side of the connector is parallel to and faces the input side of the mating connector; and
first and second registration features for mating with registration features of a mating connector along a connector mating direction different than the first and second output directions.

Item 53 is a connector comprising:
a first waveguide alignment member for receiving and aligning at least one first optical waveguide;
a second waveguide alignment member vertically offset from the first waveguide alignment member for receiving and aligning at least one second optical waveguide; and
a first light redirecting member having a unitary construction and comprising:
an input side for receiving input light from a first optical waveguide disposed and aligned at the first waveguide alignment member along a first input direction at a first location on the input side and from a second optical waveguide disposed and aligned at the second waveguide alignment member along a second input direction at a second location on the input side, the second location being vertically offset from the first location; and
an output side for receiving light from the first location on the input side and transmitting the received light as output light from a first location on the output side along a first output direction and from the second location on the input side and transmitting the received light as output light from a second location on the output side along a second output direction, the second location being different than the first location.

Item 54 is the connector of item 53, wherein the first waveguide alignment member is adapted to receive a plurality of first optical waveguides and align the first optical waveguides in a first row of the first optical waveguides, and wherein the second waveguide alignment member is adapted to receive a plurality of second optical waveguides and align the second optical waveguides in a second row of the second optical waveguides, the second row being parallel to and vertically offset from the first row.

Item 55 is the connector of item 53, wherein the first waveguide alignment member, the second waveguide alignment member, and the first light redirecting member form a unitary construction.

Item 56 is the connector of item 53, wherein the first input direction is parallel to the second input direction.

Item 57 is the connector of item 53, wherein the first and second locations on the input side are horizontally offset from each other.

Item 58 is the connector of item 53, wherein the output side is configured to change a divergence of light received from the input side.

Item 59 is the connector of item 53 further comprising a plurality of discrete optical lenses, each discrete optical lens corresponding to a different optical waveguide received and aligned at the first and second waveguide alignment members, each discrete optical lens being configured to change a divergence of light exiting the optical waveguide corresponding to the discrete optical lens.

Item 60 is the connector of item 53, wherein the first and second locations on the output side are vertically offset from each other.

Item 61 is the connector of item 53, wherein the first and second locations on the output side are horizontally offset from each other.

Item 62 is the connector of item 53, wherein the first output direction is parallel to the second output direction.

Item 63 is the connector of item 53, wherein the first output direction is parallel to the first input direction and the second output direction is parallel to the second input direction.

Item 64 is the connector of item 53 being configured to mate with a mating connector along a mating direction, the mating direction being parallel to at least one of the first and second output directions.

Item 65 is the connector of item 53, wherein the input side is parallel to the output side.

Item 66 is the connector of item 64, wherein the mating direction, the first output direction, and the second output direction are parallel.

Item 67 is the connector of item 53 further comprising at least one registration feature for mating with a registration feature of a mating connector.

Item 68 is the connector of item 53 being configured to mate with another connector of item 53.

Item 69 is the connector of item 53 being hermaphroditic.

Item 70 is the connector of item 53 further comprising at least one stacking registration feature for a vertical stacking of the connector.

Item 71 is a first connector of item 61 vertically stacked with a second connector of item 61, the at least one stacking registration feature of the first connector engaging the at least one stacking registration feature of the second connector.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited herein are incorporated by reference in their entirety.

What is claimed is:

1. A connector comprising:
    a first waveguide alignment member for receiving and aligning at least one first optical waveguide;
    a first light redirecting member comprising:
        an input side for receiving input light along an input direction from a first optical waveguide disposed and aligned at the first waveguide alignment member;
        a light redirecting side for receiving light from the input side along the input direction and redirecting the received light along a different redirected direction; and
        an output side for receiving light from the light redirecting side and transmitting the received light as output light exiting the first light redirecting member along an output direction toward an input side of a first light redirecting member of a mating connector, the first light redirecting member having a greater than one refractive index between the input and output sides;
    first and second registration features for mating with registration features of a mating connector along a connector mating direction different than the output direction, wherein the connector comprises at least one alignment feature disposed on at least one of a top and bottom surfaces of the connector for a vertical stacking of the connector; and
    a light block so that when the connector is not mated with a mating connector, light exiting the output side of the first light redirecting member is blocked by the light block.

2. The connector of claim 1 being hermaphroditic.

3. A first connector comprising the connector of claim 1 mating with a second connector comprising the connector of claim 1, wherein the first and second connectors are so oriented relative to each other that the first and second registration features of the first connector mate with the respective second and first registration features of the second connector.

4. The connector of claim 1, wherein the first light redirecting member comprises a first plurality of light redirecting elements, each light redirecting element corresponding to a different first optical waveguide received and aligned at the first waveguide alignment member and comprising:
    an input face for receiving input light from the first optical waveguide along an input direction;
    a light redirecting face for receiving light from the input face along the input direction and redirecting the received light along a different redirected direction; and
    an output face for receiving light from the light redirecting face and transmitting the received light as output light along an output direction toward an input side of a first light redirecting member of a mating connector.

5. The connector of claim 4, wherein:
    the input side of the first light redirecting member comprises the input face of each light redirecting element,
    the output side of the first light redirecting member comprises the output face of each light redirecting element, and
    the light redirecting side of the first light redirecting member comprises the light redirecting face of each light redirecting element.

6. The connector of claim 1, wherein the first waveguide alignment member, the first light redirecting member, and the registration features form a unitary construction.

7. The connector of claim 1, further comprising:
    a second waveguide alignment member vertically offset from the first waveguide alignment member for receiving and aligning at least one second optical waveguide; and
    a second light redirecting member vertically offset from the first light redirecting member and comprising:
        an input side for receiving input light along an input direction from a second optical waveguide disposed and aligned at the second waveguide alignment member;
        a light redirecting side for receiving light from the input side along the input direction and redirecting the received light along a different redirected direction; and
        an output side for receiving light from the light redirecting side and transmitting the received light as output light exiting the second light directing member along an output direction toward an input side of a second light redirecting member of a mating connector, the connector being configured so that when the connector mates with the mating connector, the output side of the second light redirecting member faces the input side of the second light redirecting member of the mating connector.

8. The connector of claim 7 comprising a first light block vertically offset from a second light block, so that when the connector is not mated with a mating connector, light exiting the output side of the first light redirecting member is blocked by the first light block and light exiting the output side of the second light redirecting member is blocked by the second light block.

9. The connector of claim 7, wherein the first waveguide alignment member comprises a first plurality of waveguide alignment elements and the second waveguide alignment member comprises a second plurality of waveguide alignment elements, each waveguide alignment element in the first plurality of waveguide alignment elements being configured to receive and align a different first optical waveguide, each waveguide alignment element in the second plurality of waveguide alignment elements being configured to receive and align a different second optical waveguide, each waveguide alignment element in the first plurality of waveguide alignment elements being vertically and horizontally offset from each waveguide alignment element in the second plurality of waveguide alignment elements.

10. The connector of claim 7, wherein the first light redirecting member comprises a first plurality of light redirecting elements and the second light redirecting member comprises a second plurality of light redirecting elements, each light redirecting element in the first plurality of light redirecting elements corresponding to a different first optical waveguide received and aligned at the first waveguide alignment member, each light redirecting element in the second plurality of light redirecting elements corresponding to a different second optical waveguide received and aligned at the second waveguide alignment member, each light redirecting element in the first plurality of light redirecting elements being vertically and horizontally offset from each light redirecting element in the second plurality of light redirecting elements.

11. The connector of claim 1, further comprising:
a second waveguide alignment member vertically offset from the first waveguide alignment member for receiving and aligning at least one second optical waveguide, wherein:
the input side of the first light redirecting member receives input light from: a first optical waveguide disposed and aligned at the first waveguide alignment member at a first location on the input side, and a second optical waveguide disposed and aligned at the second waveguide alignment member at a different second location on the input side, the second location being vertically offset from the first location,
the light redirecting side of the first light redirecting member receives light from: the first location on the input side at a first location on the light redirecting side, and the second location on the input side at a different second location on the light redirecting side, and
the output side of the first light redirecting member receives light from: the first location on the light redirecting side and transmits the received light as output light from a first location on the output side, and the second location on the light redirecting side and transmits the received light as output light from a different second location on the output side.

12. The connector of claim 11, wherein an optical path from the first location on the input side of the first light redirecting member to the first location on the output side of the first light redirecting member is substantially equal to an optical path from the second location on the input side of the first light redirecting member to the second location on the output side of the first light redirecting member.

13. A connector comprising:
a waveguide alignment member for receiving and aligning at least one optical waveguide;
a light redirecting member comprising:
an input side for receiving input light along an input direction from an optical waveguide disposed and aligned at the waveguide alignment member;
a light redirecting side for receiving light from the input side along the input direction and redirecting the received light along a different redirected direction; and
an output side for receiving light from the light redirecting side and transmitting the received light as output light exiting the light redirecting member along an output direction toward an input side of a light redirecting member of a mating connector; and
a light block so that when the connector is not mated with a mating connector, light exiting the output side of the light redirecting member is blocked by the light block.

* * * * *